Nov. 16, 1937.   J. F. NEAL ET AL   2,099,031
RESILIENT SUPPORT
Filed Jan. 7, 1935   2 Sheets-Sheet 1
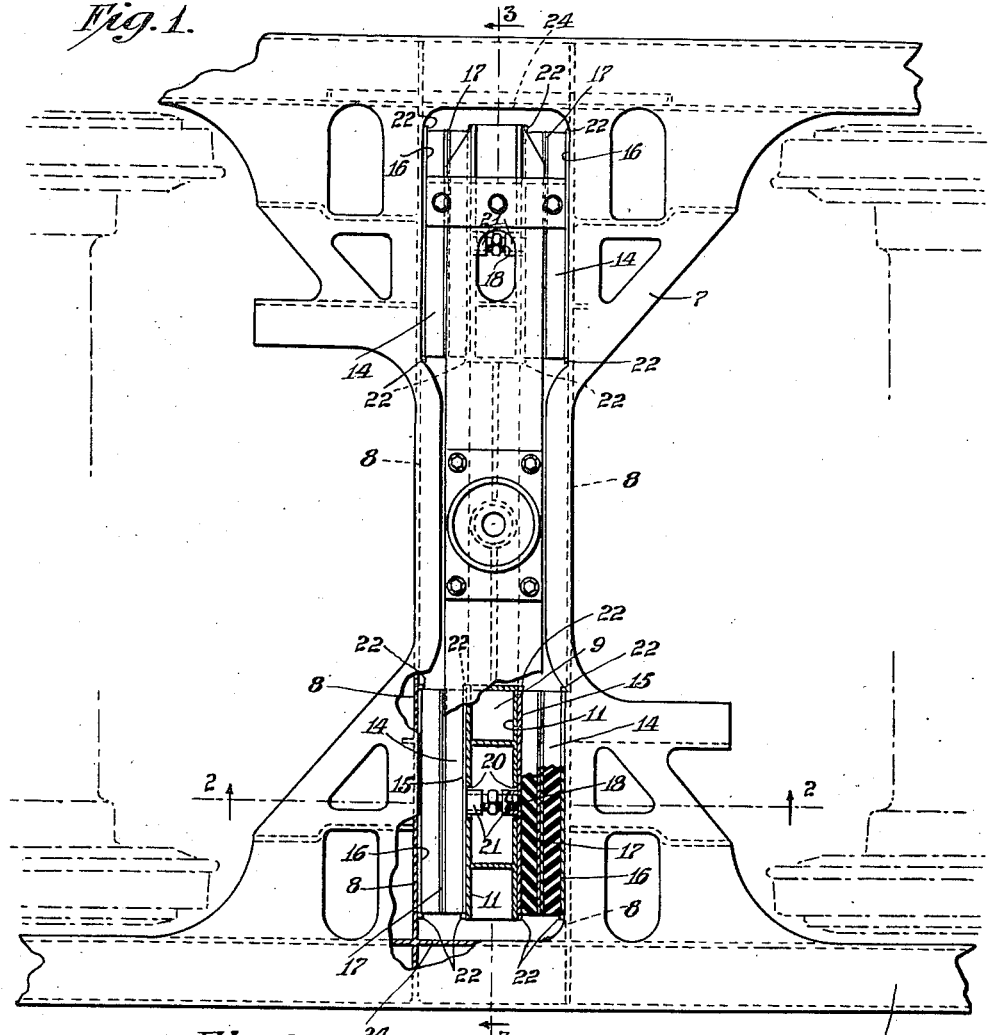
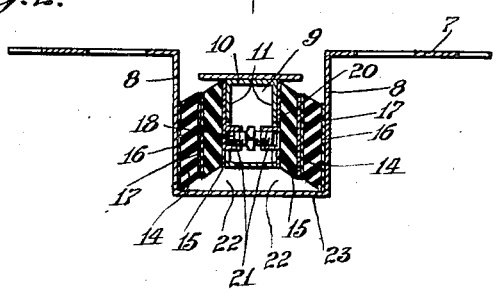
INVENTORS
John F. Neal
Walter M. Haessler
BY
ATTORNEY Nov. 16, 1937.　　J. F. NEAL ET AL　　2,099,031
RESILIENT SUPPORT
Filed Jan. 7, 1935　　2 Sheets-Sheet 2

INVENTORS
John F. Neal
Walter M. Haessler
BY
＿＿＿＿. ATTORNEY

Patented Nov. 16, 1937

2,099,031

UNITED STATES PATENT OFFICE 2,099,031

RESILIENT SUPPORT

John F. Neal and Walter M. Haessler, St. Louis, Mo.

Application January 7, 1935, Serial No. 679

3 Claims. (Cl. 105—197)

Our invention relates particularly to running gear of vehicles.

One object is to provide a simple but reliable construction for supporting the body of the vehicle in such a manner with respect to the running gear that transmission of vibrations is minimized and sound disturbances are eliminated.

A special object is to provide in a single construction means for supporting the weight against the action of gravity, means for resisting acceleration and deceleration forces and means for resisting lateral or side sway.

Although it will be understood that the invention may be applied in various ways, we prefer to embody it in a construction in which the body of the vehicle is connected to the running gear through the instrumentality of a bolster carried by the body and a transom forming a part of the running gear but with a non-metallic resilient shock absorbing device interposed between the bolster and the transom.

Fig. 1 is a plan view of parts of the running gear of a vehicle embodying our invention.

Fig. 2 is a vertical sectional view of the same taken on the plane of the line 2—2 of Fig. 1.

Figure 3:
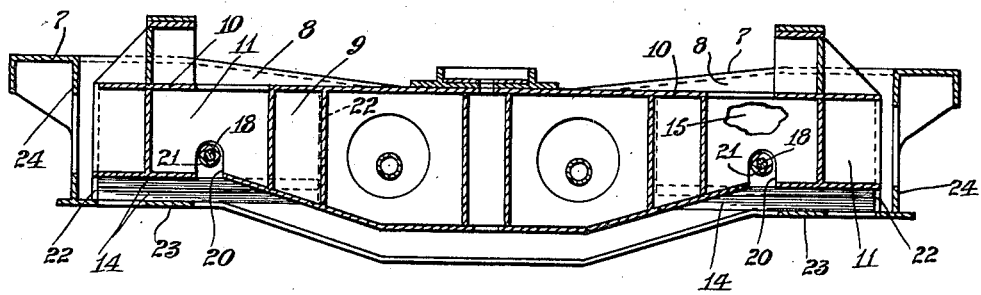
Fig. 3 is a vertical sectional view taken on the plane of the line 3—3 of Fig. 1.
Figure 4:
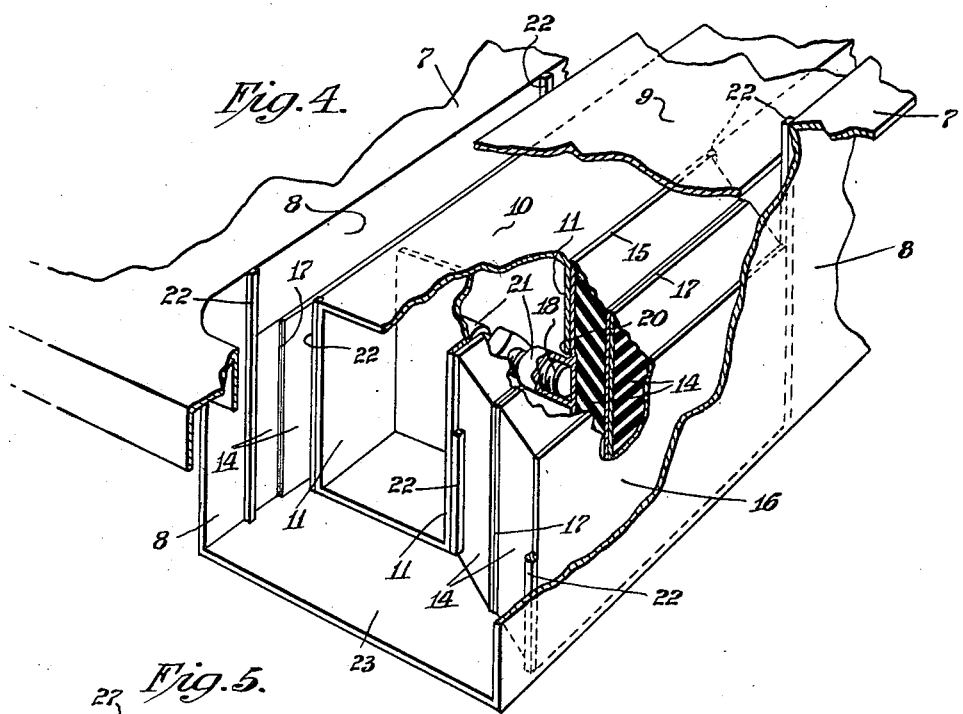
Fig. 4 is a perspective view showing the shock absorbing device.

The main frame or transom 7 will be understood as a part of the truck of a vehicle such as a trolley car, railway car or other vehicle having suitable wheels, etc. (not shown).

This transom has a box-like formation extending across the truck with vertical walls 8, 8, with a space between the walls in which is housed the bolster 9 which extends from side to side of the truck and is itself of box-like form having a top plate 10 and side walls 11, 11. The weight of the vehicle body is supported by this bolster in the usual manner.

Interposed between each end of the bolster and the adjacent walls of the transom is a shock absorbing device which includes resilient rubber blocks 14, 14 which are maintained under pressure. Each block has an inner face plate 15 and an outer face plate 16 and each block may be made up of one or more layers of rubber permanently united to the face plates.

One or more metal plates 17 may be embedded in or formed as a part of each block. An expanding screw 18 or other suitable device is interposed between oppositely disposed blocks so that the inner faces of the blocks may be moved away from each other. The outer faces 16 are forced into contact with the side walls 8, 8 of the transom and the weight of the bolster and supported parts rests upon the upper edges of the plates 15. The side walls 11 of the bolster are notched at 20 to allow for the screw 18 or the screw seats 21.

To assemble the parts the shock absorbing devices are dropped into the channel of the transom in their proper positions and the bolster is then dropped into place and the expanding screws 18 operated to compress the resilient blocks 14, 14, the weight of the bolster and supported parts resting upon the inner edges of the resilient blocks. It will thus be seen that the vertical component of the weight is supported by the shearing resistance of the blocks. The longitudinal or accelerating and braking stresses are absorbed by the compression of the blocks 14, 14 and the lateral or transverse or side sway is taken up by the horizontal shearing resistance of the blocks.

Positioning lugs 22, 22 may be provided for locating the shock absorbing blocks in their proper positions in the transom. The downward vertical movement of the bolster in the transom is limited by the bottom plate 23 of the transom and the transverse movement of the bolster in the transom is limited by the plate 24.

In some types of car construction provision is made for the bolster and supported body to rise on the side toward which deflection occurs. This may be accomplished in our construction by suitably formed guides, if desired, although in some types of cars where the load is large with respect to the weight of the car this may not be so necessary.

Figure 5:
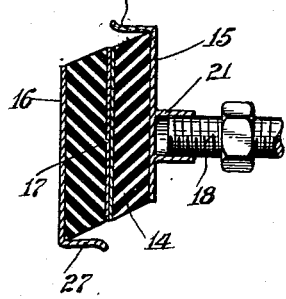
Fig. 5 is a sectional view showing a modified detail of construction.

In Fig. 5 we have shown a detail of construction in which the plates 15 and 16 are provided with inwardly turned flanges 27, 27 which overlap the upper and lower edges respectively of the resilient shock absorbing block. These flanges are so shaped as to distribute the load and in effect reduce the width of that portion of the block which is subjected to shearing stress as deflection increases. In this way it is possible to provide a resilient supporting block capable of considerable deflection under light loads and of a gradually reduced rate of deflection under heavier loads, thus providing gradually increased resistance to deflection.

By means of our invention we are able to provide a support of an adequate character which prevents transmission of vibrations from the roadbed to the car body and deadens the sound of metallic contact. Such a construction is peculiarly desirable in high speed transportation.

It should be also understood that this invention is applicable to various types of running gear whether or not applied to rubber tired or metal tired wheels.

Among the obvious advantages of this type of resilient spring support are the non-transmission of acoustic and non-acoustic vibrations as a result of which riding comfort is increased and fatigue lessened in the structural framework of the car body, also a complete three dimensional flexibility of the car body with respect to the truck resulting in the elimination of concentrated loads on the car body and frame. This flexibility allows for an easy car body movement while the car is traversing uneven track.

A great weight saving is accomplished by this type of spring over conventional supports of the same capacity and even greater weight saving may be accomplished by using this three dimensional spring in a truck in place of the conventional bolster and swing hanger construction such as commonly employs elliptic and coil springs.

This type of support is free of the detrimental resonant conditions made in ordinary types of springs which result in vibrations of great amplitude at critical car speeds. This condition is avoided with the use of rubber springs of our invention. Due to the adherent physical properties of soft rubber the vibrations imposed will be more quickly dampened than in conventional types of springs. By the use of the lugs or wings disclosed in Fig. 5 a variable load deflection curve is obtained which results in smooth riding performance over all ranges of loading. By adjusting the flanges or wings the deflection action may be adjusted to suit specified deflections and movements.

We claim:

1. Vehicle running gear having a transom and a bolster with a pair of resilient devices interposed between the bolster and the transom for resisting vertical, lateral and longitudinal stresses and means for applying a variable compression to said devices.

2. The combination with a truck or the like having a channel-like frame with bottom and side walls, of a bolster having side plates and top flanges, means for resiliently supporting said bolster in the frame, said means consisting of rubber blocks under compression between the side plates and adjacent channel side walls, the lower outer edges of the blocks resting on the bottom of the channel-like frame and the top flanges of the bolster being supported on the upper inner edges of the blocks and means for limiting the endwise movement of the bolster in the frame.

3. Vehicle running gear having a channel-like frame, a bolster movable in the frame, a pair of spaced rubber blocks adjacent each end of the frame, said blocks having upwardly projecting inner edges and adjustable means in the space between the blocks of each pair of blocks for compressing said blocks laterally within the frame, said bolster being supported on the upwardly projecting edges of said blocks.

WALTER M. HAESSLER.
JOHN F. NEAL.